Figure 1:
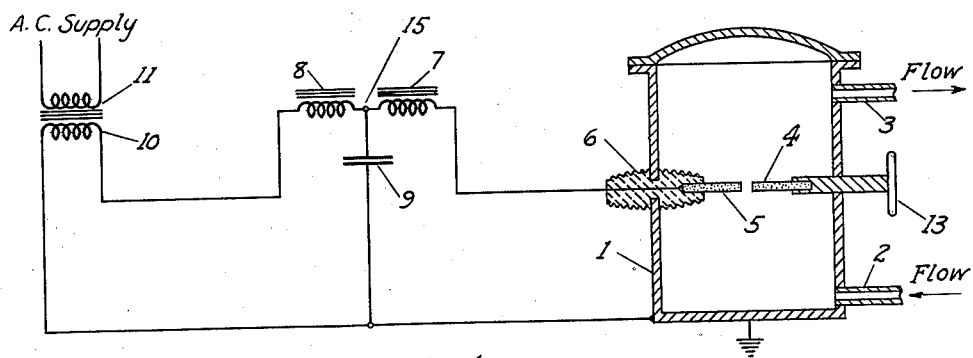

Aug. 1, 1939.　　　V. F. HANSON　　　2,167,976
ELECTRIC ARC APPARATUS FOR PRODUCING CHEMICAL REACTIONS
Filed Jan. 2, 1936　　　3 Sheets-Sheet 1

INVENTOR.
Victor F. Hanson
BY Theodore J. Buchan
ATTORNEY.

Aug. 1, 1939.　　　V. F. HANSON　　　2,167,976
ELECTRIC ARC APPARATUS FOR PRODUCING CHEMICAL REACTIONS
Filed Jan. 2, 1936　　　3 Sheets-Sheet 2

INVENTOR.
Victor F. Hanson
BY
ATTORNEY.

INVENTOR.
Victor F. Hanson
BY Theodore T. Budrow
ATTORNEY.

Patented Aug. 1, 1939

2,167,976

UNITED STATES PATENT OFFICE 2,167,976

ELECTRIC ARC APPARATUS FOR PRODUCING CHEMICAL REACTIONS

Victor F. Hanson, Niagara Falls, N. Y., assignor to E. I. du Pont de Nemours & Company, Wilmington, Del., a corporation of Delaware Application January 2, 1936, Serial No. 57,170

2 Claims. (Cl. 204—31)

This invention relates to the thermal decomposition of liquid carbonaceous products such as hydrocarbon oils and the like by means of an electric arc submerged beneath the surface of the liquid to produce useful products such as carbon-black and gaseous products and more particularly to an improved method and means for controlling the characteristics of the electric arc in such processes.

The use of the electric arc for supplying extremely high localized temperatures for producing chemical reactions has been previously proposed in a number of patents. A great difficulty has always been experienced, when using the electric arc for this purpose in a medium of high dielectric strength such as a hydrocarbon oil, in maintaining a steady arc without the necessity of using extremely high voltages, thereby making it necessary to limit the current flow with inductive reactive equipment.

When the series reactor or its equivalent of a high leakage transformer or alternator is used in the arc circuit a very poor power factor results (between 30 and 40%) which must be improved for commercial reasons by the use of power factor correction equipment. The improvement of the power factor is accomplished only at considerable expense in electrical equipment investment and the losses associated in the operation thereof.

Another objection to this type of series reactive equipment is the difficulty of striking and establishing the arc in the medium of high dielectric strength when the arcing gap is sufficiently long for satisfactory operating conditions. This has necessitated the use of applied voltages of approximately 2-3 times the normal operating voltage, which necessitates the use of equipment of great size in comparison to the amount of energy actually supplied to the arc.

For example, I have operated a three phase arcing unit for the production of carbon black and hydrocarbon gas by submerged arc treatment of a liquid hydrocarbon in which the current flow was limited by a three phase iron core reactance of the following characteristics:

Frequency 25 cycles.
Applied voltage 7000 volts per coil.
Current at 100% reactance, 22 amps.
Kva. per phase, 154.
Maximum power input per arc, 55 kw.
Ratio $$\frac{\text{kva. reactance}}{\text{kw. arc}} = \frac{154}{55} = 2.8$$

Maximum power factor, 40%.

I have thus found that it is necessary to use 2.8 kva. of current limiting equipment per kw. of useful arcing energy in the above mentioned unit. Since it is necessary to operate such a process at power factors approaching unity, it is necessary to correct the lagging power factor resulting from the use of the inductance current limiting means by suitable power factor correction apparatus. This necessitates the use of approximately 2.5 kva. of correcting apparatus per kw. of power input to the arcs, making a total of 5.3 kva. of reactive and corrective electrical equipment per kw. power input to the arc, which involves such great expense that the use of this equipment is not commercially feasible.

In using such reactive current limiting means in series with an arc in a medium of high dielectric strength, there is a variation of arc voltage drop in the course of normal operation that alters the total impedance of the arc and reactance circuit resulting in variations of current flow of 25–30%. For example, in the above mentioned three phase arcing system the arc voltage varies from 1000 to 4000 volts with current variations from 22 amperes to 16 amperes during normal operation.

I have found that this variation in arcing current is very detrimental in the production of a commercially marketable carbon black. In order to produce carbon black of a uniform particle size and a uniform rate of cure when compounded in rubber, I have discovered that it is necessary to limit the variation in arcing current to less than 4%. When using arcing apparatus in which the distortion of the arcs depend on rotation of the electrodes or the flow of liquid through the arcs, there exists a relationship between arc distortion, arc current and product characteristics. I have found it preferable from the standpoint of producing a uniform improved quality of product to maintain uniform arc distortion, as determined by electrode speed or oil flow rates and a substantially invariable current flow. The first may be accomplished by the use of constant speed motors, the latter by methods herein described.

An object of the present invention is to provide an improved method for carrying out chemical reactions in liquid media of high dielectric strength by means of an electric arc submerged in such media. A further object is to provide means for controlling the characteristics of an electric arc operating submerged in a liquid of high dielectric strength and more specifically, to provide means whereby such submerged arc, for example, one operating in a liquid hydrocarbon to produce decomposition products, may be operated with little or no variation in current flow. Other objects will be apparent from the following description of my invention.

The above objects are attained in accordance with the present invention by providing means for supplying to an electric arc submerged in a liquid of high dielectric strength a substantially constant current or a current which will not vary by more than 10%. I have found that such non-varying current can be supplied to such submerged arc by means of a resonant circuit which is composed of inductance and capacitance connected in series across applied constant voltage supply, said inductance and capacitance having substantially equal reactance at the supplied power frequency. In accordance with my invention, the above described type of resonant circuit is adapted to supply current to the submerged electric arc, with an applied power frequency of about 25 to 125 cycles.

Figure 2:
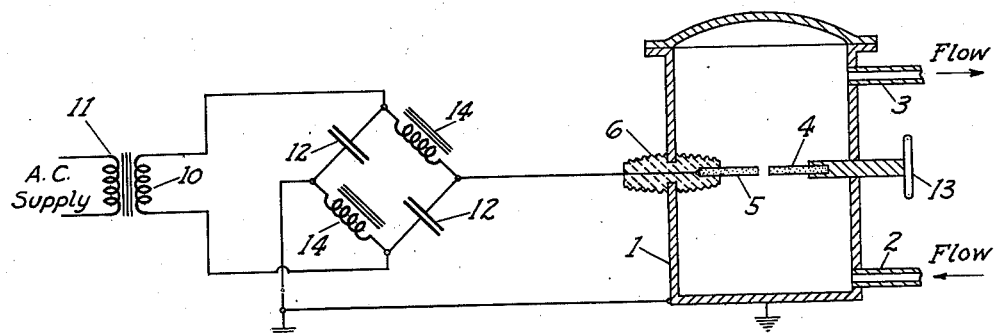
Figure 5:
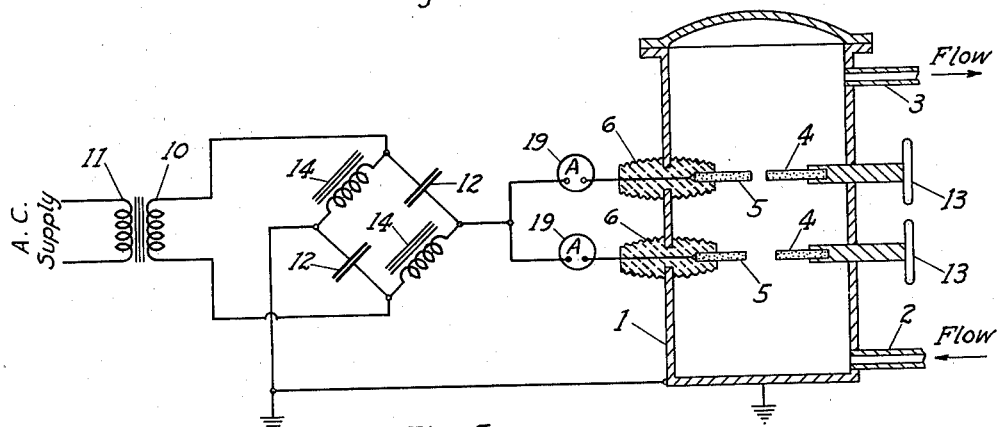
Figure 6:
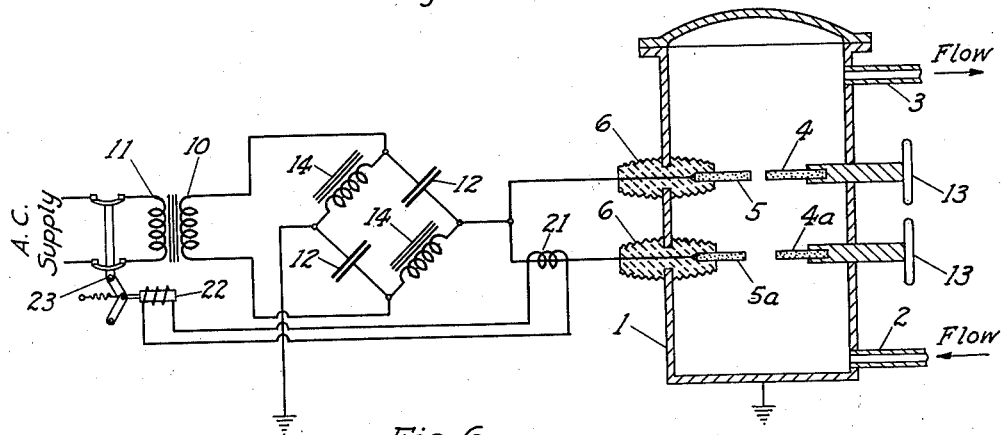

The appended drawings are diagrammatic illustrations of different forms of my invention. Figs. 1 and 2 show the invention applied to single-arc systems, Fig. 3 illustrates a three-phase system with three arcs, Figs. 5 and 6 illustrate other systems with a plurality of arc gaps.

Figure 3:
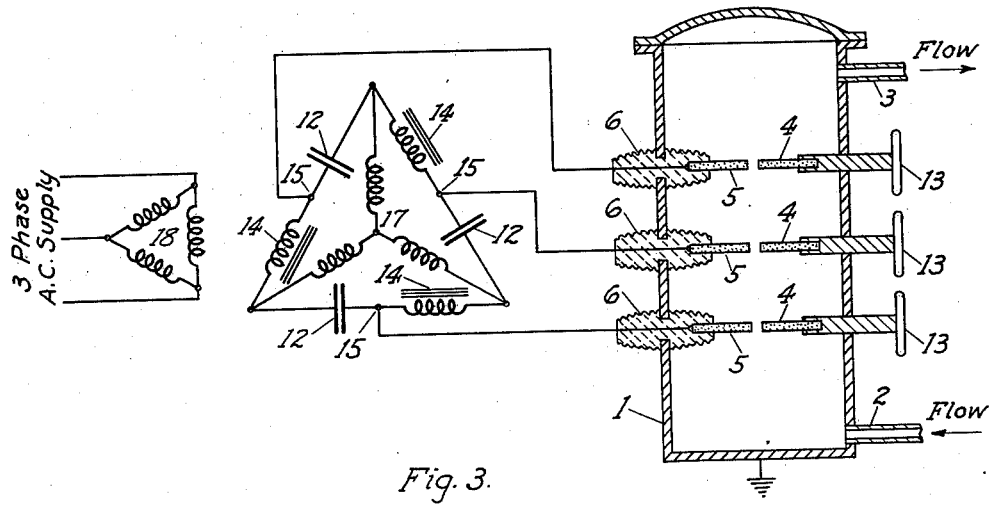

In order to overcome the above stated objections to the series reactive equipment which heretofore has been used for arc control, I have found that the use of a combination of inductive and capacitive reactances consisting of equal reactance at the applied power supply frequency connected in the form known as the "T resonating circuit" shown in Fig. 1, or preferably in the form known as the "monocyclic square" shown in Fig. 2, for one or two phase power supply or of the polyphase resonant type shown in Fig. 3, used on a polyphase system provides a valuable improvement in the products and results in improved operation of the equipment producing these products and better control of the arc.

I shall refer to these circuits herein as "resonant circuits", since they are composed of inductances and condensers of equal reactance at the applied frequency of the constant voltage supply source and therefore will resonate on open arc circuits. In accordance with the present invention, the application of these circuits is limited to commercial frequencies from about 25 to 125 cycles per second.

Referring to the appended drawings, Fig. 1 illustrates diagrammatically a reaction vessel 1, into which a liquid hydrocarbon flows through inlet 2, the products of reaction and undissociated liquid flows out through outlet 3. Electrode 4, which may be moved with respect to the opposite electrode 5, by adjusting screw 13, which is electrically connected to vessel 1. Electrode 5, which is insulated from vessel 1, by insulation bushing 6, is connected to a self inductance coil 7. Inductance coil 7, is connected to another inductance coil 8, preferably of the same characteristics as coil 7, and also to a condenser 9, at junction 15. Condenser 9 has substantially the same reactance as inductance coil 8 at the frequency of the supply source alternating current. The other terminal of the inductance coil 8, is connected to a transformer secondary 10, the other terminal of which is connected to the condenser 9, and the reaction vessel 1. The primary of the transformer 10—11 is connected to the constant voltage supply. When the resistance of the arc circuit is high, the series resonant circuit of inductance 8, and condenser 9, supplies a higher potential at junction 15, thereby keeping the current flowing in the inductance 7, and the arc substantially constant.

Fig. 2 illustrates a preferred form of my invention. The reaction vessel 1, which is similar to that of Fig. 1 is provided with inlet 2, outlet 3, adjustable electrode 4, with adjusting means 13, and stationary electrode 5, passing through bushing 6. Electrode 5, is connected to a system consisting of two self inductance coils 14, and two condensers 12 of substantially equal reactance at the frequency of the supply voltage. These condensers and inductances are arranged in the form of a square with the inductances 14 on opposite sides of the square and the condensers 12 on the other two sides, opposite each other. The arcing electrodes 4 and 5 are connected across one diagonal of the square and the transformer secondary 10, is connected across the opposite diagonal. The primary 11 of the transformer is connected to a constant voltage alternating current supply source.

Figure 4:
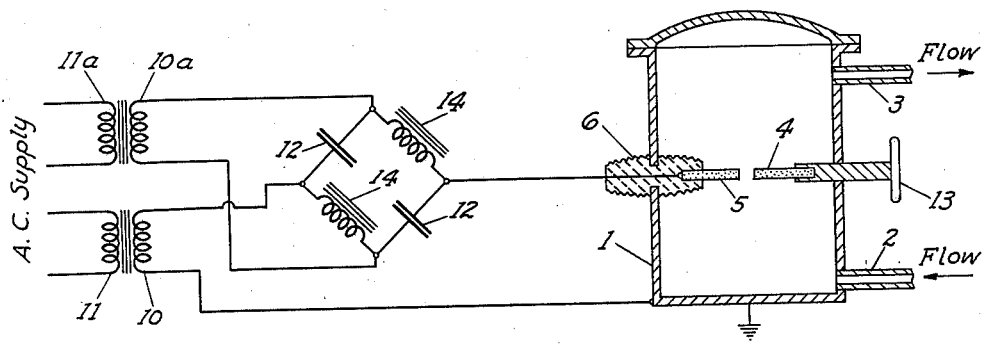

Fig. 4 illustrates an arrangement similar to that of Fig. 2, connected to a two-phase source of alternating current supplied. The metal reaction vessel 1, is provided with adjustable arcing electrode 4, connected to the vessel 1, electrode adjusting means 13, inlet pipe 2, outlet pipe 3, and stationary electrode 5, insulated from vessel 1, by bushing 6. Vessel 1, preferably is grounded. Electrode 5 is connected to the squared system of inductances 14, and condensers 12, in the same manner as in Fig. 2. The corner of the "square" diagonally opposite the connection to electrode 5, is connected in series with one secondary 10, of a two-phase transformer and the reaction vessel 1. The other two corners of the "square" are connected with the other secondary 10a of the two-phase transformer. The transformer primaries 10 and 10a are connected to a source of alternating current supply. This arrangement supplies constant current to the arc, regardless of load conditions and distributes the load equally on the two-phases under optimum operating conditions.

Fig. 3 illustrates a preferred polyphase arcing system consisting of reaction vessel 1, liquid supply pipe 2, outlet pipe 3, three electrodes 4, which are all of the same potential and are connected to vessel 1, which preferably is grounded. Electrodes 5, are insulated from vessel 1, by lead in bushings 6. Each electrode 5, is connected to a junction 15 between an inductance 14 and a condenser 12, which have substantially equal reactance at the frequency of the constant voltage supply source, and in turn are connected across the secondary 17 of a polyphase transformer. Secondary 17 is energized by primary 18 of the transformer. The circuit is completed through electrodes 4.

Fig. 5 illustrates a reaction chamber 1, with liquid supply pipe 2, and outlet pipe 3, a plurality of grounded electrodes 4, a plurality of electrodes 5, insulated by lead in bushings 6, a means 19 for indicating current flow (e. g., a ammeter) connected to each electrode 5, and a resonant constant current supply circuit similar to that shown in Fig. 2. Arcing gap lengths are so disposed that one or more arc gaps are set for normal safe arc operating voltage; these may be termed "operating gaps". One or more other gaps may be used as "emergency gaps" by setting them for the maximum safe voltage. The "emergency gaps" then will arc only when the voltage across the "operating gaps" becomes abnormally high, for example if an electrode becomes broken or burned away. By reference to the current indicating means, the operator may determine in which "operating gap" circuit the current is no longer flowing and then may restore that gap to operation by suitably adjusting or renewing the electrodes.

Fig. 6 illustrates an apparatus similar to that of Fig. 5, except that the emergency gap 4a has in its circuit a means 21 of energizing the trip 22, of a circuit breaker 23 which is placed in the constant voltage supply circuit. In this case, the circuit is broken when current flows through the emergency gap 4a.

It should be noted that while it is preferable that one of the two arcing electrodes be connected to ground, this is not essential to the operation of the process. Instead of being connected to the metal reaction vessel, this electrode may be insulated from said vessel and the return circuits brought through the shell by means of another insulator bushing.

Figure 7:
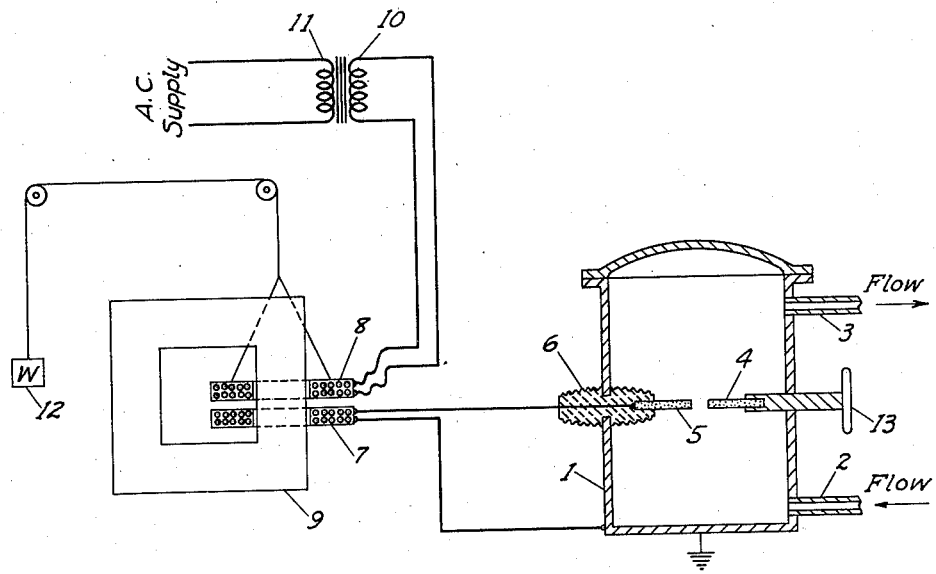

Fig. 7 illustrates a reaction vessel 1, into which a hydrocarbon or other liquid undergoing pyrolysis flows through pipe 2, products of reaction and undissociated liquid being withdrawn through pipe 3. Arcing electrodes 4, and 5 are connected to the secondary 7, of a constant current transformer, electrode 5, being insulated from reaction vessel 5, by bushing 6. The constant current transformer consists of an iron core 9, secondary coil 7, and a movable primary coil 8, which is counter-balanced by weight 12, in such a manner that coil 8, moves with respect to 7, automatically under varying load conditions to maintain a substantially constant current in the arc. Primary coil 8, is connected with a source of constant voltage alternating current supply 10-11.

Figure 8:
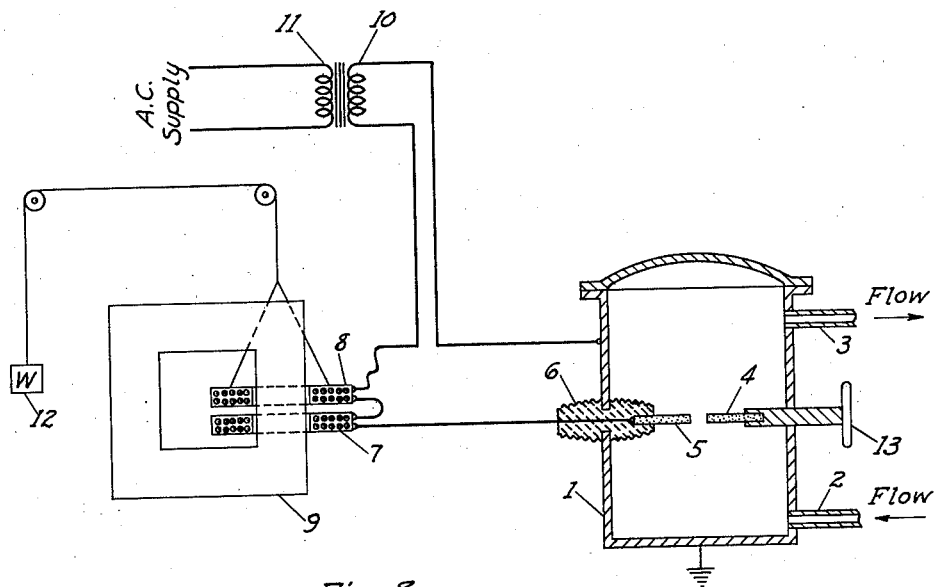

Fig. 8 illustrates a similar reaction vessel to that in Fig. 7, except that the constant current to the arcing electrodes 4, and 5, is supplied by a constant current reactor consisting of an iron core 9, and a fixed coil 7, connected in series with a coil 8, movable with respect to 7, counter-balanced by weight 12, in such manner as to maintain constant current under varying load conditions. Said coil 8, is connected to a transformer secondary 10, which in turn is connected to electrode 4, to complete the circuit. Primary 11, of the transformer is connected to a constant voltage alternating current supply.

I have found that in normal operation of these types of resonant currents when applied to an arc gap submerged in a liquid dielectric, the current flowing through the arcs can be maintained within about 2% of the predetermined value, regardless of the arcing gap length and arc voltage, compared to a 25% variation when using other known types of current limiting means with an arc in a medium of high dielectric strength. The overall power factor also is improved to values closely approaching unity by means of my invention, thereby affecting substantial reductions in equipment losses and improving the yield of product per unit of electrical energy consumed.

While theoretically it is possible to obtain 1 kw. of power input to the arc per 1.15 kva. of reactive equipment in using the circuit shown by Fig. 3, I have found that it is preferable to operate the arcs at slightly lower voltage than the theoretical maximum, giving apparatus utility of approximately 1.5 kva. per kw. of power input with a power factor of 85% to 90% as compared to a system using the series reactance with power factor correction apparatus requiring 5.3 kva. of apparatus at the same power factor.

I have also discovered that by the use of such resonant circuits a much more stable arcing condition is obtained, since in open arc circuits the inductance and condenser, which are then in series across a constant potential alternating current power supply, resonate producing voltages even greater than the supply line voltage thereby expediting the breaking down of the gap in the dielectric and establishing the arc. Thus the high open circuit voltage developed is of very great importance in maintaining a steady arc in such arcing medium.

I have found that a greatly improved control of the quality of the product is obtained in using this type of circuit on an arcing apparatus for the production of chemical reactions producing carbon black, hydrocarbon gas and hydrogen from a liquid hydrocarbon. The range of size of the carbon black particles is greatly reduced, thereby improving the quality of the product for use as a rubber reinforcing agent and as a pigment for inky paints, and other well known applications where carbon black is used. A hydrocarbon gas of controlled ratio of acetylene to hydrogen can also be thus obtained.

Another means of supplying a source of constant current is by the use of a so-called constant current transformer or a constant current reactor in which one of two windings is movable with respect to the other, being so disposed as to automatically move apart with decreasing load impedence and move toward each other on increasing load impedance, thereby maintaining a constant current in the arc circuit. While this means supplies a satisfactory constant current regulation, it does not have the high open arc circuit voltage necessary to maintain a steady arc in a medium of high dielectric strength.

Since the resonant circuits of my invention tend to supply a constant current regardless of load conditions, I have found that dangerous voltages may develop when electrodes break off and the arcing gap is much greater than that used in normal operation. In order to protect the electrical equipment from damage due to excessive voltages which may develop under such abnormal circumstances, I prefer to employ a protective means consisting of auxiliary arcing gaps within the reaction chamber which will arc over, precluding the development of unsafe voltages and thereby protecting the electrical insulation without any loss in power that would otherwise occur in such protective device.

A preferred arrangement for use on a multi arc system is one in which the plurality of arcs are either all in one reaction chamber as shown in Figs. 3, 5, and 6, or one in which there is a single arc in each of a number of reaction chambers.

My invention is applicable to any of the various types of electrode arrangements used in a medium of high dielectric strength such as the rotating type of electrodes, hollow electrodes through which the liquid hydrocarbon flows into the arcing gap, or stationary types as shown in the appended drawings.

I claim:

1. In an arcing reaction chamber for producing chemical reactions, a polyphase arcing unit consisting of a plurality of pairs of electrodes mounted at such a level as to be submerged in a carbonaceous liquid, one of each pair of which is connected to a common point of inductive and capacitive reactances in resonance at the applied alternating current frequency, which reactances are connected in series across a constant voltage alternating supply source, the other electrodes of each pair being connected together to form a return circuit for the current of the various arcs.

2. An apparatus comprising in combination, an arcing reaction chamber for the pyrolysis of carbonaceous liquids to carbon black, hydrogen, and unsaturated hydrocarbons and a constant current supply source connected to a pair of electrodes mounted at such a level as to be submerged in a carbonaceous liquid and consisting of a resonant circuit composed of inductance and capacitance connected in series across a source of constant voltage, alternating power supply, said inductance and capacitance having substantially equal reactance at the frequency of said alternating power supply.

VICTOR F. HANSON.